United States Patent [19]
Dickson et al.

[11] Patent Number: 5,266,914
[45] Date of Patent: Nov. 30, 1993

[54] MAGNETIC CHUCK ASSEMBLY

[75] Inventors: Robert M. Dickson, Coventry; Hermann Schmidt, East Hartford, both of Conn.

[73] Assignee: The Herman Schmidt Company, East Hartford, Conn.

[21] Appl. No.: 898,138

[22] Filed: Jun. 15, 1992

[51] Int. Cl.$^5$ .................... B25B 11/00; H01F 7/20
[52] U.S. Cl. .................... 335/288; 269/8; 335/286; 335/295
[58] Field of Search .................... 335/285–295, 335/296, 298, 302; 269/8; 294/65.5, 88

[56] References Cited

U.S. PATENT DOCUMENTS

| | | | |
|---|---|---|---|
| 2,203,512 | 6/1940 | Wesemann | 175/367 |
| 2,209,558 | 7/1940 | Bing et al. | 175/367 |
| 2,347,023 | 4/1944 | Beechlyn | 175/367 |
| 3,109,967 | 11/1963 | Churchill | 317/159 |
| 3,231,789 | 1/1966 | Engelsted | 317/159 |
| 3,812,629 | 5/1974 | Campbell | 335/295 |
| 4,055,824 | 10/1977 | Baermann | 335/288 |
| 4,401,961 | 8/1983 | Baermann et al. | 335/285 |
| 4,408,752 | 10/1983 | Uchikune et al. | 269/8 |
| 4,900,888 | 2/1990 | Lee et al. | 219/69.11 |

Primary Examiner—Leo P. Picard
Assistant Examiner—Raymond Barrena
Attorney, Agent, or Firm—St. Onge Steward Johnston & Reens

[57] ABSTRACT

A magnetic chuck assembly comprises top and bottom plates separated by a layer of non-magnetizable material, each plate having magnetizable sections separated by strips of non-magnetic material. A rotor mounted between the top and bottom plates carries a plurality of permanent magnets substantially symmetrically disposed therein. The magnets in each half of the rotor are of the same polarity but those in one half are of opposite polarity to those in the other. When the rotor is turned to a position in which all the magnets of like polarity in one half thereof lie between the magnetizable sections of the plates on the same side of the non-magnetizable strips, the sections become magnetized and hold a magnetizable workpiece in place on the edges of the plate. Switching the rotor to a position in which equal numbers of magnets of opposite polarity lie between the magnetizable sections serves to de-energize the latter and release the workpiece.

11 Claims, 4 Drawing Sheets

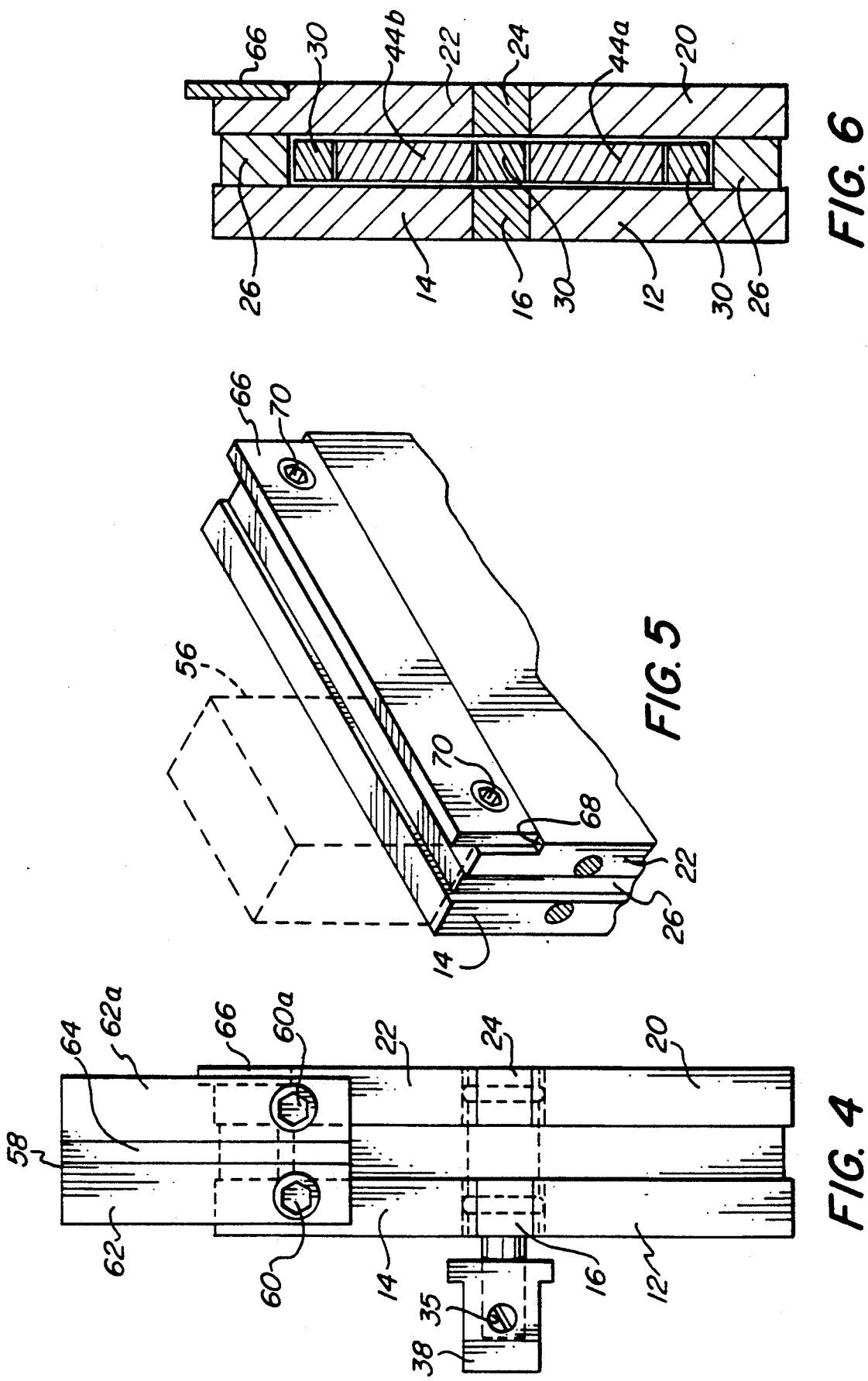

MAGNETIC CHUCK ASSEMBLY

BACKGROUND OF THE INVENTION

This invention relates to magnetic work-holding devices and is more particularly concerned with an improved permanent magnetic chuck assembly.

Various types of permanent magnetic chucks are known in the art.

Churchill U.S. Pat. No. 3,109,967 describes a magnetic chuck in which an inner member having a plurality of permanent magnets is slidably movable from a position in which the magnets energize magnetizable bars in the workpiece receiving surface to a position in which the magnets are in contact with non-magnetizable bars in the same surface.

Engelsted U.S. Pat. No. 3,231,789 describes a chuck in which there is a fixed member having a plurality of plate-shaped permanent magnets and of plate-shaped soft magnetic bodies separating the magnets and a laterally movable member having a corresponding array of magnets and magnetic bodies. In each member the magnets have alternating polarity. In the ON position of the chuck the magnets in the fixed and movable members have like polarity. In the OFF position the magnets in the two members have opposite polarity thus producing a weakened magnetic field. Uchikune et al U.S. Pat. No. 4,408,752 shows a related device.

Magnetic chucks have also become known in which rotary switch mechanisms are employed. Wesemann U.S. Pat. No. 2,203,512 describes a chuck in which a long bar permanent magnet can be rotated from a position in which it energizes a pole bar in the workpiece receiving surface to a position in which polarity is reversed.

Bing et al U.S. Pat. No. 2,209,558 employs bipolar cylindrical magnets rotatable within sleeves of soft iron which form the workpiece receiving surface. Beechlyn U.S. Pat. No. 2,347,023 employs a rotatable bar magnet centered between two permanent magnets located in the magnetizable body of the chuck. In the ON position the field of the rotatable magnet reinforces that of the permanent magnets. In the OFF position the fields are opposed. Lee U.S. Pat. No. 4,900,888 describes a chuck comprising upper and lower magnetizable plates separated by an insulating layer with a cylindrical bipolar magnet mounted rotatably and longitudinally separating the insulating layer into two parts. In the ON position one pole of the cylindrical magnet is in contact with the upper plate and the other with the lower plate. In the OFF position both poles contact each plate.

The present invention represents a significantly improved magnetic chuck assembly having greater holding power and characterized by simplified construction which makes the manufacture of the device significantly easier.

SUMMARY OF THE INVENTION

It is an object of the invention to provide a magnetic chuck having less complicated and more compact construction than those presently available in the art. It is another object of the invention to provide a magnetic chuck having improved holding power for workpieces.

These objects, and other objects which will become apparent to one skilled in the art from the description which follows, are met by the device of the present invention.

Thus, the magnetic chuck of this invention comprises top and bottom plates mounted in parallel relationship and separated by a layer of non-magnetizable material. Each of the top and bottom plates comprises magnetizable sections separated by a strip of non-magnetizable material, the strips in the top and bottom plates being oriented in substantially parallel relationship. Rotor means of non-magnetic material is rotatably mounted between the top and bottom plates. In one half of the rotor means are mounted at least two magnets of like polarity and, in the second half thereof, are mounted an equal number of magnets of substantially equal overall potency to those in the first half but of opposite polarity. Handle means is provided to move the rotor between (1) a first position in which all of the magnets located in the first half of the rotor are situated on one side of the strips of non-magnetizable material and all the magnets in the second half of the rotor are located on the other side of the strips and (2) a second position in which half of the magnets in both first and second halves of the rotor are located on one side of the strips and the other half of the magnets in the first and second halves of the rotor are on the other side of the strips. Matching edges of one section in each of the top and bottom plates are contoured to act as a workpiece receiving surface.

While the magnetic chucks of the invention can be employed to hold workpieces in a wide variety of applications they find particular use in association with wire electronic discharge machines.

BRIEF DESCRIPTION OF THE DRAWINGS

FIG. 4 is a side elevational view taken from the right-hand side of the embodiment of the invention shown in FIG. 2.

FIG. 5 is a partial sectional perspective view of an optional feature of an embodiment in accordance with the invention.

FIG. 6 is a cross-sectional view taken along the line 6—6 in the embodiment shown in FIG. 2.

DETAILED DESCRIPTION OF THE INVENTION

The invention will now be described with reference to particular embodiments thereof.

Figure 1:
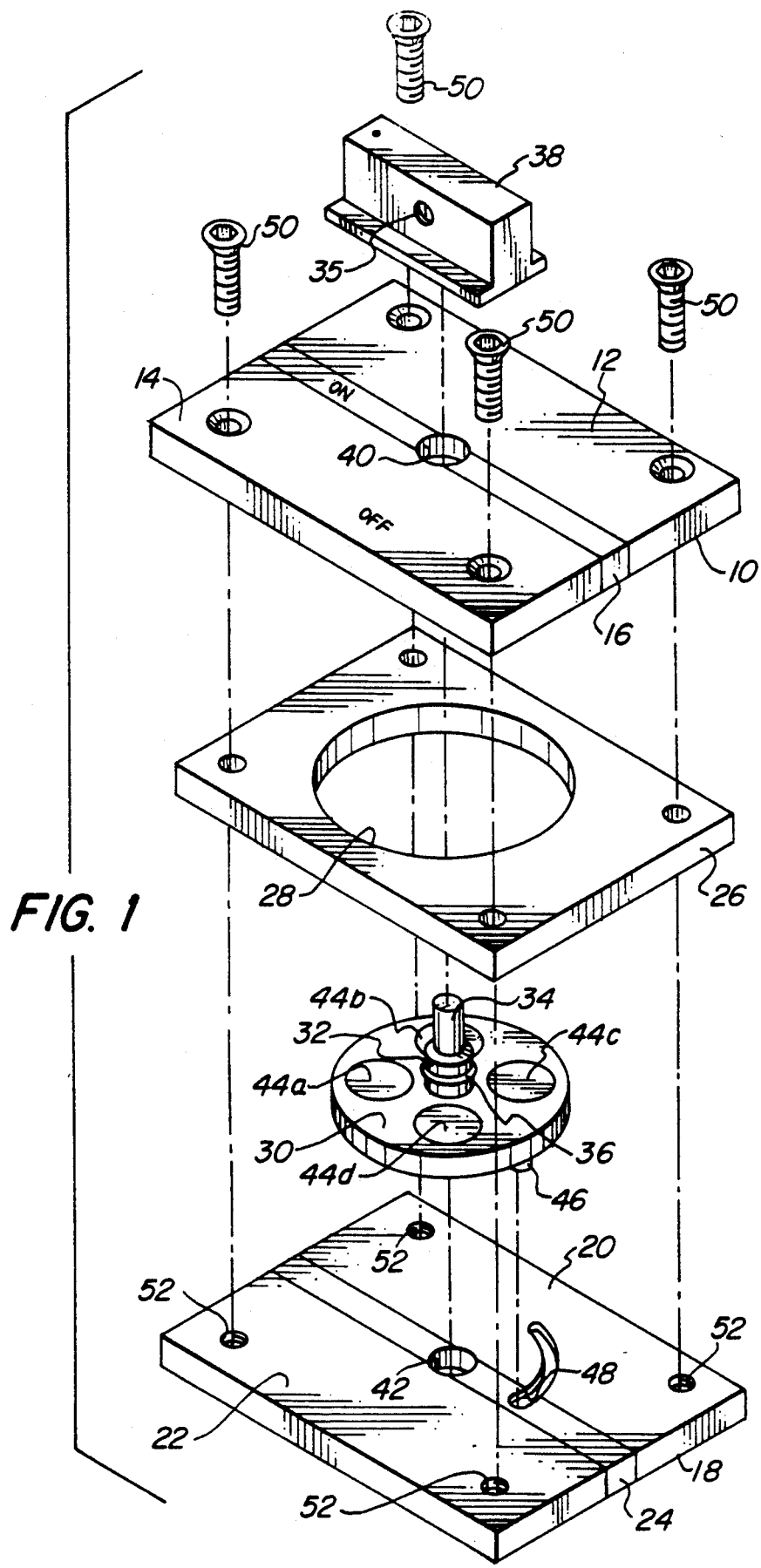
FIG. 1 is an exploded view of a typical embodiment of a magnetic chuck in accordance with the invention.

Referring firstly to the exploded view of a typical embodiment of the invention as shown in FIG. 1, top plate 10 is comprised of two magnetizable sections 12 and 14 which are joined together by a bar 16 of non-magnetizable material such as brass, copper, aluminum, non-magnetic stainless steel (300 series), non-metallic composites, and the like. The sections 12 and 14 are fabricated from magnetizable materials such as magnetic stainless steel (400 series), iron, steel capable of conducting magnetism, and the like. Bar 16 is joined to the appropriate edges of sections 12 and 14 by brazing or like methods. Similarly, bottom plate 18 comprises magnetizable sections 20 and 22 joined together by non-magnetizable bar 24, all of which components are fabricated from the same or like materials as in top plate 10. Separating top and bottom plates 10 and 18 is a layer 26 of non-magnetizable material such as brass and the like materials discussed in relation to bar 16. Advantageously, layer 26 has exterior dimensions fractionally less than those of top and bottom plates 10 and 18 and is provided with cutout portion 28 to accommodate rotor 30. The latter has mounted therein an axle 32 having a portion 34 of reduced diameter which provides a seat for switch handle 38 anchored on said axle portion 34 by set screw 35 (see also FIG.4) or like means. Axle 32 is also provided with an annular channel in which is fitted 0-ring 36. When the device shown in FIG.1 is fully assembled, axle 32 is inserted through aperture 40 in top plate 10 and the portion of said axle projecting below the rotor (not visible in the exploded view shown) is inserted through aperture 42 in bottom plate 18.

Rotor 30 has housed therein four disc magnets 44a, 44b, 44c and 44d of which 44a and 44d are of the same polarity and 44b and 44c each have polarity opposite to that of the first named pair. These magnets are all substantially equal in potency. Any permanent disc magnet can be employed. Illustrative of such magnets are rare earth, alnico and ceramic magnets and the like. In a preferred embodiment the magnets are of the iron-boron-neodymium (NdFeB) type. Pin 46 projecting downwardly from a position close to the perimeter on the underside of rotor 30 is adapted to engage arcuate groove 48 in the upper face of bottom plate 18 thereby permitting a rotation of 90 degrees by rotor 30 between the ON and OFF position of the latter as will be illustrated further below. The fully assembled device of the invention, shown in exploded view in FIG.1, is held together by appropriately counter sunk bolts 50 cooperating with threaded channels 52 in bottom plate 18.

Figure 2:
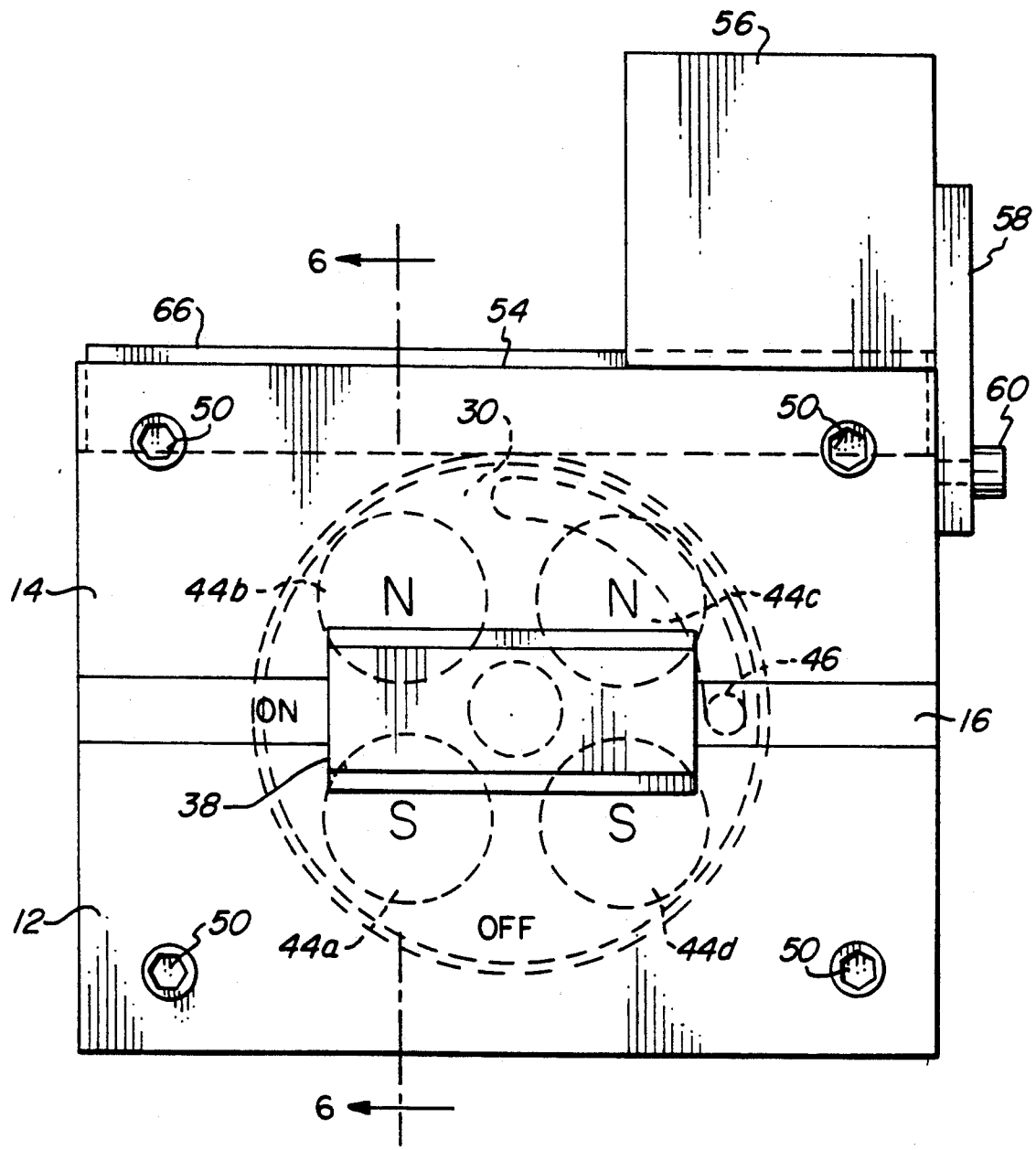
FIG. 2 is a top plan view of a modified form of the embodiment of the invention shown in FIG. 1.
Figure 3:
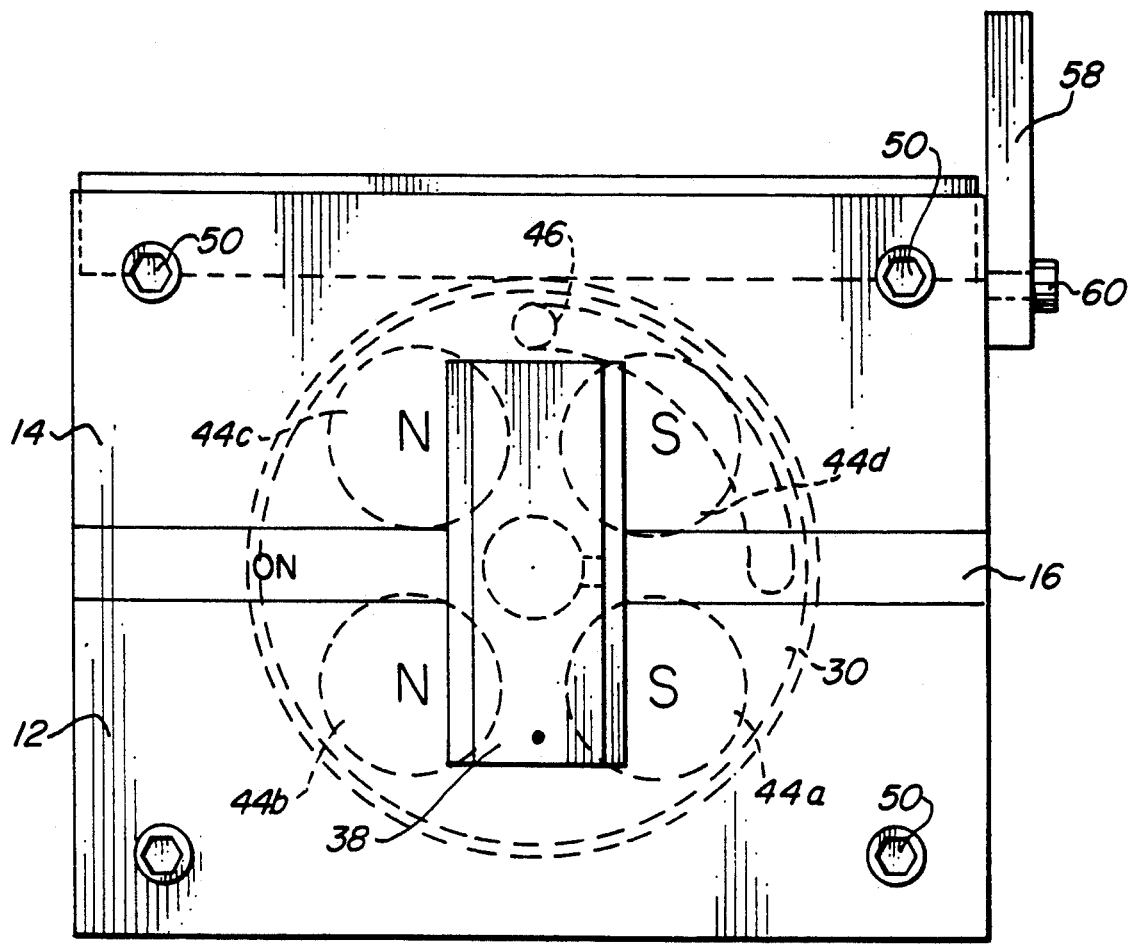
FIG. 3 is a second top plan view of a modified form of the embodiment of the invention shown in FIG. 1.

FIGS. 2 and 3 show a plan view taken from above of a modified form of the magnetic chuck shown in FIG.1 and illustrate the chuck in the ON (workpiece retaining) position and the OFF (workpiece releasing) position, respectively. Thus, in the ON position of switch 38 shown in FIG.2, magnets 44b and 44c (shown in dotted lines) are both of N polarity and both lie between section 14 of upper plate 10 and section 22 of lower plate 18 on one side of non-magnetic bars 16 and 24. Similarly, magnets 44a and 44d (also shown in dotted lines) are both of S polarity and lie on the other side of non-magnetic bars 16 and 24 between section 12 of upper plate 10 and section 20 of lower plate 18. Sections 14 and matching lower section 22 are thereby energized as also are section 12 and matching lower section 20. The longitudinal edge 54 of section 14 and the corresponding edge of lower section 22 are thereby enabled to hold in place a magnetizable workpiece 56. To assist in holding the latter in position, the chuck shown in FIG.2 is optionally provided with magnetizable bracket plate 58 which is held in place by bolts 60 and 60a threaded into the abutting edge of sections 14 and 22. The placement and method of attachment of bracket plate 58 is shown in greater detail in FIG.4. Plate 58 is formed of two magnetizable sections 62 and 62a separated by a central strip 64 of non-magnetizable material such as brass, the sections and the strip being secured together by brazing or like means.

Referring again to FIG.2, an additional, optional aid to holding a workpiece in secure stable position on edge 54 of section 14 and the corresponding edge of section 22, comprises flange 66 which projects from the underside of section 22. The method of attachment of this flange is shown in the partial section view shown in FIG.5 in which bracket plate 58 is omitted for the sake of clarity. In the latter view flange 66 is received in longitudinal recess 68 provided on the lower side of section 22 and held in place by threaded bolts 70.

FIG.6 is a cross-sectional view taken along lines 6—6 in FIG.2 and serves to illustrate further the various features discussed in relation to FIG.2. In particular it will be seen that magnets 44b and 44a and rotor 30 in which they are housed are spaced apart from the abutting walls of sections 12, 14, 20 and 22 by a small gap which is advantageously of the order of about 5/1000ths of an inch in order to permit rotation of the rotor without permanent attachment of the magnets to the said abutting walls.

Referring now to FIG.3, in which the elements common to this and previous figures are indicated by the same numerals, switch 38 is shown in the OFF, i.e. demagnetized, position. In FIG.3, the switch 38 and attached rotor 30 have been rotated through 90 degrees in an anti-clockwise direction from the position shown in FIG.2. Magnets 44b and 44c of like N polarity are now located on opposite sides of non-magnetic bar 16. Similarly, magnets 44a and 44d of the S polarity are also now located on opposite sides of non-magnetic bar 16. Accordingly, magnets 44c and 44d of opposite polarity on the one side of bar 16 effectively cancel each other as do magnets 44a and 44b on the other side of bar 16. Matching sections 14 and 22 and 12 and 20 are thereby de-energized and workpiece 56 can be removed from the chuck.

The invention has been described above by reference to various specific embodiments for purposes of illustration only but is not limited thereto. As will be obvious to one skilled in the art, various modifications can be made to the specific embodiments without departing from the scope of the invention. Illustratively, the number of magnets in rotor 30 can be increased provided that the number of equal polarity in each half thereof, and the overall potency of the magnets in each half, are maintained equal. Similarly the cross-sectional configuration of the magnets and/or the rotor need not be circular as shown in the particular embodiments discussed above, but could be square, hexagonal, rectangular or like shapes. The workpiece receiving surface of the chuck could be contoured to receive workpieces having non-linear edges of any desired configuration. Other such possible modifications will be readily apparent to one skilled in the art.

What is claimed is:

1. A magnetic chuck assembly comprising, in combination, top and bottom plates mounted in parallel relationship and separated by a layer of non-magnetizable material;

each of said plates comprising magnetizable sections separated by a strip of non-magnetizable material, said strips in said top and bottom plates being oriented in substantially parallel relationship;

non-magnetic rotor means rotatably mounted between said top and bottom plates, said rotor means having mounted in a first half thereof at least two magnets of like polarity and, in the second half thereof, an equal number of magnets of substantially equal overall potency but of opposite polarity to those in said first half of said rotor; and handle means adapted to move said rotor between a first position in which all the magnets located in said first half of said rotor means are situated on one side of said strips of non-magnetizable material and all the magnets in said second half of said rotor means are located on the other side of said strips and a second position in which half the magnets in both said first and second halves of said rotor means are situated on one side of said strips and the other half of the magnets in both said first and second halves of said rotor means are on the other side of said strips.

2. A magnetic chuck assembly in accordance with claim 1 wherein said magnetizable sections of said top and bottom plates lying on the same side of the strips of non-magnetizable materials are provided with matching edges contoured to form a surface to receive a workpiece.

3. A magnetic chuck assembly in accordance with claim 2 wherein said surface is provided with magnetizable flange means.

4. A magnetic chuck assembly in accordance with claim 3 wherein said flange means is detachably mounted on the underside of said contoured edge of the magnetizable section of said bottom plate 5. A magnetic chuck assembly in accordance with claim 1 wherein there are two magnets located in each of said first and second halves of said rotor means.

6. A magnetic chuck assembly in accordance with claim 5 wherein all of said magnets are iron-boron-neodymium permanent magnets 7. A magnetic chuck assembly comprising, in combination,
top and bottom plates mounted in parallel relationship and separated by a substantially coextensive layer of non-magnetizable material;
each of said plates comprising magnetizable rectangular sections of substantially equal dimensions joined together by a bar of non-magnetizable material;
non-magnetic rotor means rotatably mounted substantially symmetrically between said top and bottom plates, said rotor means having two permanent magnets mounted in each half thereof, the magnets in each half being of like polarity and potency, those in one half being of opposite polarity to those in the other half; and
handle means adapted to move said rotor between a first position in which said magnets of like polarity in one half of said rotor means are located on one side of said bars of non-magnetizable material and said magnets of like but opposite polarity in the other half of said rotor means are located on the other side of said bars and a second position in which two of said magnets of unlike polarity are located on either side of said bars.

8. A magnetic chuck assembly in accordance with claim 7 wherein all of said magnets are iron-boron-neodymium permanent magnets.

9. A magnetic chuck assembly in accordance with claim 7 wherein matching longitudinal edges of said magnetizable sections of said top and bottom plates form a surface to receive a magnetizable workpiece.

10. A magnetic chuck assembly in accordance with claim 9 wherein said surface is provided with magnetizable flange means.

11. A magnetic chuck assembly in accordance with claim 10 wherein said flange means is detachably mounted on the underside of said matching edge of the magnetizable section of said bottom plate.

* * * * *